US012671923B2

(12) United States Patent
Lin

(10) Patent No.: US 12,671,923 B2
(45) Date of Patent: Jun. 30, 2026

(54) ELECTRONIC DEVICE

(71) Applicant: Merry Electronics(Shenzhen) Co., Ltd., ShenZhen (CN)

(72) Inventor: Ching Hsiung Lin, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 175 days.

(21) Appl. No.: 18/818,525

(22) Filed: Aug. 28, 2024

(65) Prior Publication Data

US 2026/0046542 A1 Feb. 12, 2026

(30) Foreign Application Priority Data

Aug. 9, 2024 (TW) ................................ 113129968

(51) Int. Cl.
*H04R 1/02* (2006.01)
*H04R 1/1025* (2026.01)

(52) U.S. Cl.
CPC ............ *H04R 1/02* (2013.01); *H04R 1/1025* (2013.01)

(58) Field of Classification Search
CPC ...... H04R 1/02; H04R 1/1025; H04R 1/1058; H04R 1/1016
See application file for complete search history.

(56) References Cited

U.S. PATENT DOCUMENTS 9,507,387 B2 * 11/2016 Tsao ..................... G06F 1/1616

* cited by examiner

*Primary Examiner* — Tuan D Nguyen
(74) *Attorney, Agent, or Firm* — JCIPRNET

(57) ABSTRACT

An electronic device includes a first structure, a second structure and a fixing assembly. The fixing assembly is disposed on the first structure and includes a first cam, a second cam and an adjustment element. The first end of the adjustment element is exposed to the outside of a first housing, and the second end of the adjustment element passes through the first cam and the second cam. When the first structure is connected to the second structure, a first engaging part of the second structure engages with a second engaging part of the second cam to assume a first state. The adjustment element rotates and drives the first cam to rotate relative to the second cam, thereby pushing the second cam away from the first cam to release an engaging relationship between the second engaging part and the first engaging part, and assume the second state.

12 Claims, 11 Drawing Sheets

ELECTRONIC DEVICE

CROSS-REFERENCE TO RELATED APPLICATION

This application claims the priority benefit of Taiwan application serial no. 113129968, filed on Aug. 9, 2024. The entirety of the above-mentioned patent application is hereby incorporated by reference herein and made a part of this specification.

BACKGROUND

Technical Field

The disclosure relates to an electronic device, and in particular relates to an electronic device with replaceable internal elements.

Description of Related Art

Generally speaking, traditional electronic devices (e.g., earphones) typically feature built-in batteries that are not designed for user replacement. Therefore, how to enable internal element replacement in electronic devices and facilitate operation is one of the problems to be solved in this field.

SUMMARY

An electronic device whose internal elements can be conveniently replaced is provided in the disclosure.

The electronic device of the disclosure includes a first structure, a second structure and a fixing assembly. The first structure includes a first housing. The second structure is removably connected to the first structure and includes a first engaging part. The fixing assembly is disposed on the first structure and includes a first cam, a second cam and an adjustment element. The second cam includes a second engaging part. The adjustment element has a first end and a second end opposite to each other. The first end is exposed to an outer side of the first housing, and the second end passes through the first cam and the second cam to extend into an inner side of the first housing. When the first structure is connected to the second structure, the first engaging part engages with the second engaging part to assume a first state. During the transition from the first state to a second state, the adjustment element rotates and drives the first cam to rotate relative to the second cam, thereby pushing the second cam away from the first cam along an axial direction of the adjustment element, to release an engaging relationship between the second engaging part and the first engaging part.

In an embodiment of the disclosure, the first cam is fixed to the adjustment element, and the first cam is located between the second cam and the first end.

In an embodiment of the disclosure, the first cam has a first surface away from the first end and includes a first protrusion protruding from the first surface. The second cam has a second surface facing the first surface and includes a second protrusion protruding from the second surface. The first protrusion has two first inclined surfaces and a first top surface located between the two first inclined surfaces. The second protrusion has two second inclined surfaces and a second top surface located between the two second inclined surfaces.

In an embodiment of the disclosure, in the first state, the first surface corresponds to the second top surface, and the second surface corresponds to the first top surface.

In an embodiment of the disclosure, during the transition from the first state to a second state, the first top surface of the first protrusion moves from the second surface through a corresponding second inclined surface to the second top surface.

In an embodiment of the disclosure, the fixing assembly further includes an elastic member that is sleeved on a shaft part of the adjustment element and connected to a side of the second cam away from the second surface. When the first protrusion corresponds to and pushes the second protrusion, the second cam compresses the elastic member. When the first protrusion and the second protrusion are misaligned, the second cam is reset by elastic force.

In an embodiment of the disclosure, the fixing assembly further includes a first supporting frame, a second supporting frame and a fixing part. The first supporting frame is connected to the inner side of the first housing. The second supporting frame is disposed on the first supporting frame and includes a groove. The fixing part is disposed in the groove, one end of the elastic member is connected to the fixing part, another end of the elastic member is connected to the second cam, and the second end of the adjustment element is inserted into the fixing part.

In an embodiment of the disclosure, the second cam has a side surface surrounding the second surface, and the second engaging part protrudes from the side surface.

In an embodiment of the disclosure, the first housing includes a pivot shaft located on the inner side, the pivot shaft is parallel to a shaft part of the adjustment element, and the second cam has a side surface surrounding the second surface and includes a pivot connection part connected to the side surface. The pivot shaft is inserted into the pivot connection part.

In an embodiment of the disclosure, the first engaging part has a first bevel, the second engaging part has a second bevel. During a transition from the second state to the first state, the first engaging part abuts the second bevel through the first bevel to push the second cam.

In an embodiment of the disclosure, the electronic device further includes a battery module, the second structure includes a base, the battery module is disposed at the base, and the first engaging part protrudes from a wall surface of the base.

In an embodiment of the disclosure, the first structure further includes a second housing. The first housing is assembled to the second housing and forms an opening. The second structure further includes a shell member. In the first state, the shell member is located at the opening.

Based on the above, in the electronic device of the disclosure, the adjustment element rotates and drives the first cam to rotate relative to the second cam, thereby pushing the second cam away from the first cam along an axial direction of the adjustment element, to release an engaging relationship between the second engaging part and the first engaging part, thereby allowing the second structure to be completely separated from the first structure. In this way, the user can easily replace the elements on the second structure without affecting the appearance of the product.

In order to make the above-mentioned features and advantages of the disclosure comprehensible, embodiments accompanied with drawings are described in detail below.

DETAILED DESCRIPTION OF DISCLOSED EMBODIMENTS

Figure 1:
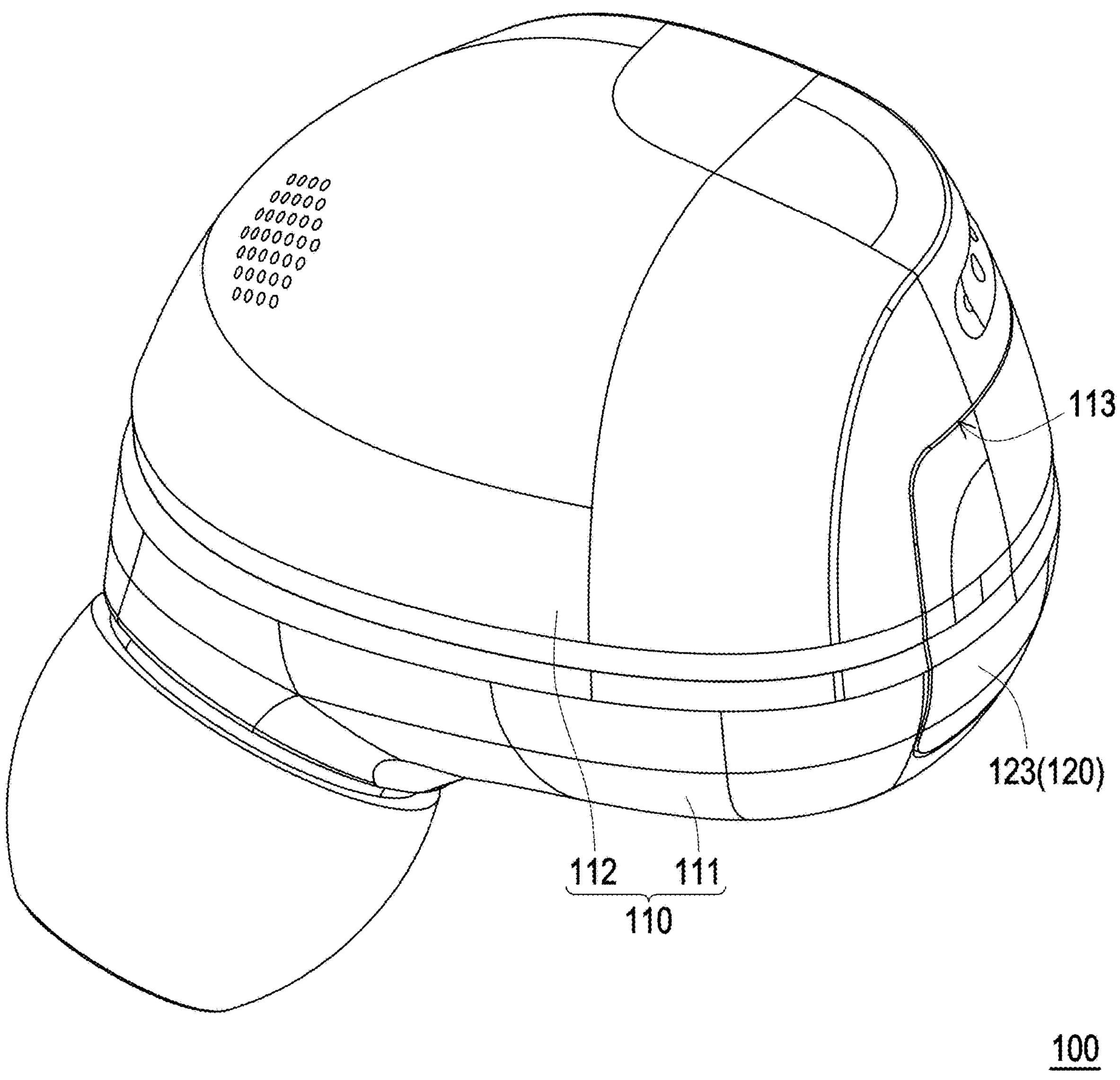
FIG. 1 is a three-dimensional diagram of an electronic device according to an embodiment of the disclosure.
Figure 2A:
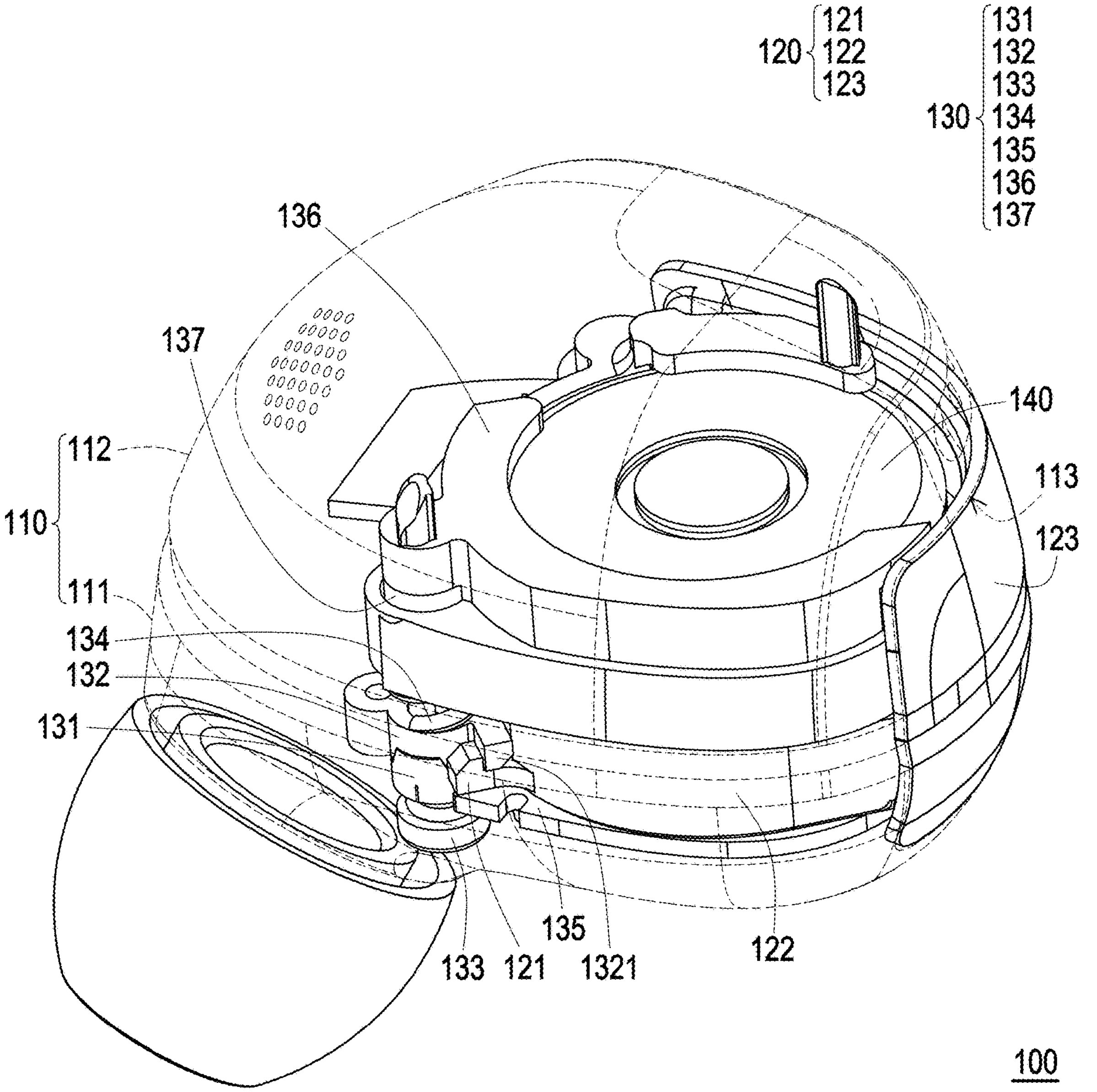
FIG. 2A is a perspective diagram of the electronic device in FIG. 1.
Figure 2B:
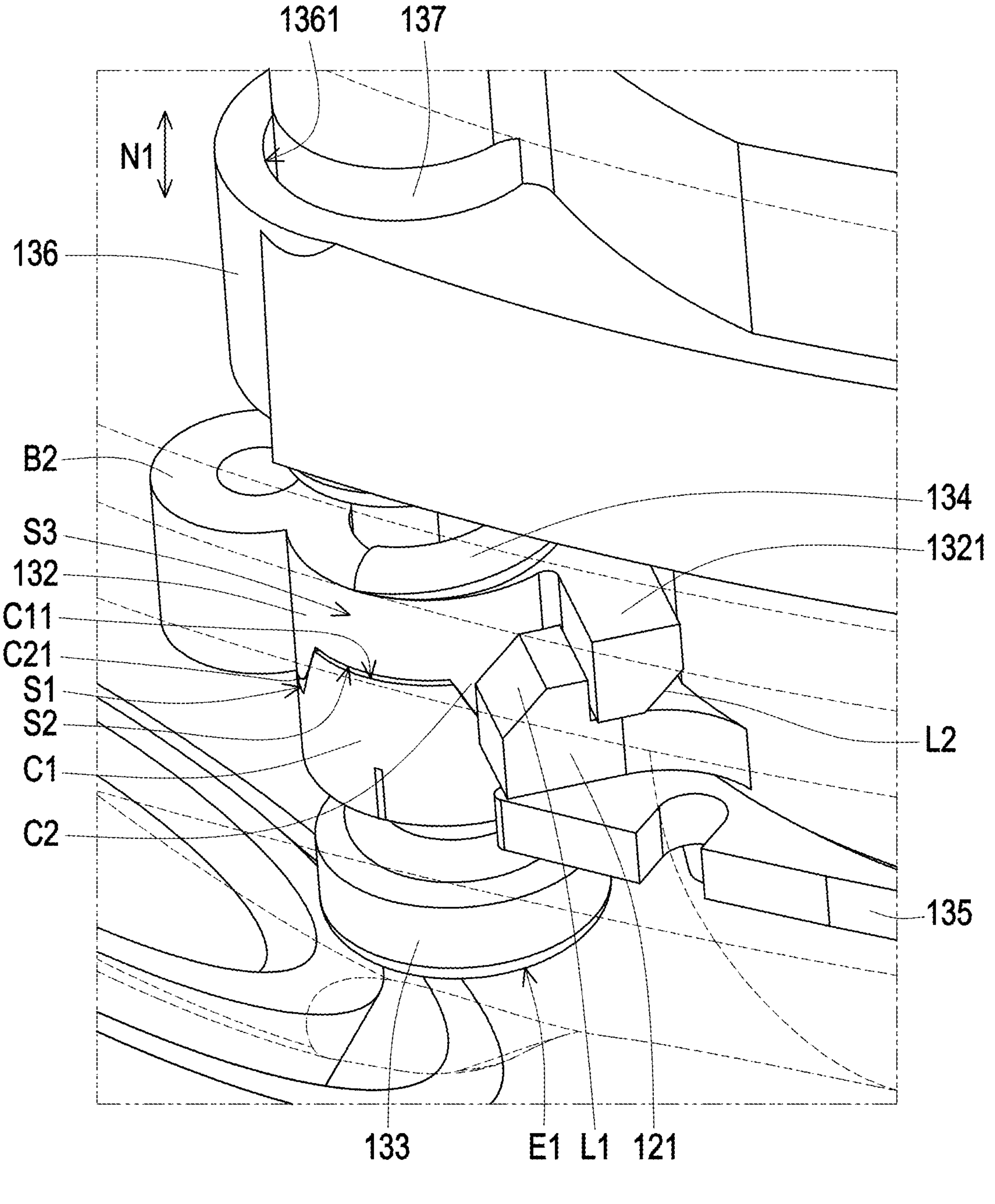
FIG. 2B is a partially enlarged schematic diagram of the electronic device in FIG. 2A.
Figure 3:
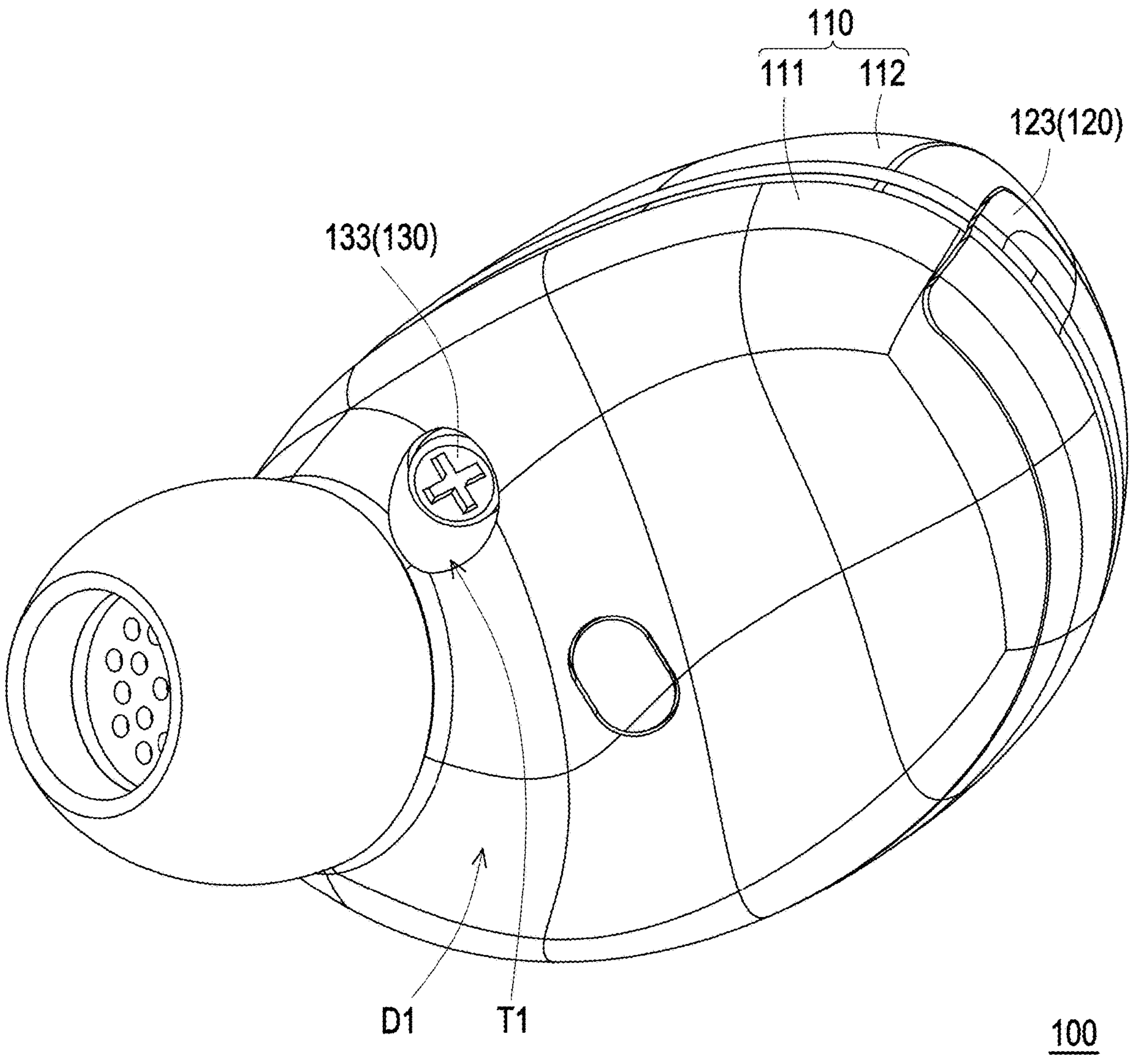
FIG. 3 is a three-dimensional diagram of the electronic device of FIG. 1 from another viewing angle.

FIG. 1 is a three-dimensional diagram of an electronic device according to an embodiment of the disclosure. FIG. 2A is a perspective diagram of the electronic device in FIG. 1. FIG. 2B is a partially enlarged schematic diagram of the electronic device in FIG. 2A. FIG. 3 is a three-dimensional diagram of the electronic device of FIG. 1 from another viewing angle. It should be noted that the outer contour of the housing in FIG. 2A is shown with dashed lines to clearly indicate the internal structure.

Referring to FIG. 1 to FIG. 3, the electronic device 100 of this embodiment includes a first structure 110, a second structure 120 and a fixing assembly 130. In this embodiment, the electronic device 100 is, for example, an earbud, and the size of the eartip can be appropriately adjusted according to actual requirements, but not limited thereto. In other embodiments, the electronic device 100 may also be a portable speaker, and the disclosure is not limited thereto.

In this embodiment, the first structure 110 includes a first housing 111 and a second housing 112. The first housing 111 is assembled to the second housing 112 and forms an opening 113. The second structure 120 further includes a shell member 123. In the first state shown in FIG. 2A, the shell member 123 is located at the opening 113. The first housing 111, the second housing 112 and the shell member 123 form an appearance surface of the electronic device 100.

In detail, in this embodiment, the second structure 120 is removably connected to the first structure 110. The second structure 120 can move into the opening 113 to connect to the first structure 110, or move out of the opening 113 to separate from the first structure 110. Specifically, the second structure 120 includes a first engaging part 121. The fixing assembly 130 is disposed on the first structure 110 and includes a first cam 131, a second cam 132 and an adjustment element 133. The second cam 132 includes a second engaging part 1321. Here, the adjustment element 133 is, for example, a screw, which is configured to actuate the first cam 131 and the second cam 132, but the disclosure is not limited thereto.

Referring to FIG. 2B, in this embodiment, when the first structure 110 is connected to the second structure 120, the first engaging part 121 engages with the second engaging part 1321 to assume a first state.

In one embodiment, the first cam 131 and the second cam 132 are, for example, manufactured through plastic injection molding, and the material is, for example, polyoxymethylene (POM), but not limited thereto. In one embodiment, the first cam 131 and the second cam 132 are, for example, manufactured through metal powder injection molding, and the material is, for example, alloy steel (SKD11), but not limited thereto.

Referring to FIG. 3, in this embodiment, the first end E1 of the adjustment element 133 is exposed to the outer side D1 of the first housing 111 to facilitate the user to adjust the adjustment element 133, but not limited thereto.

Figure 4A:
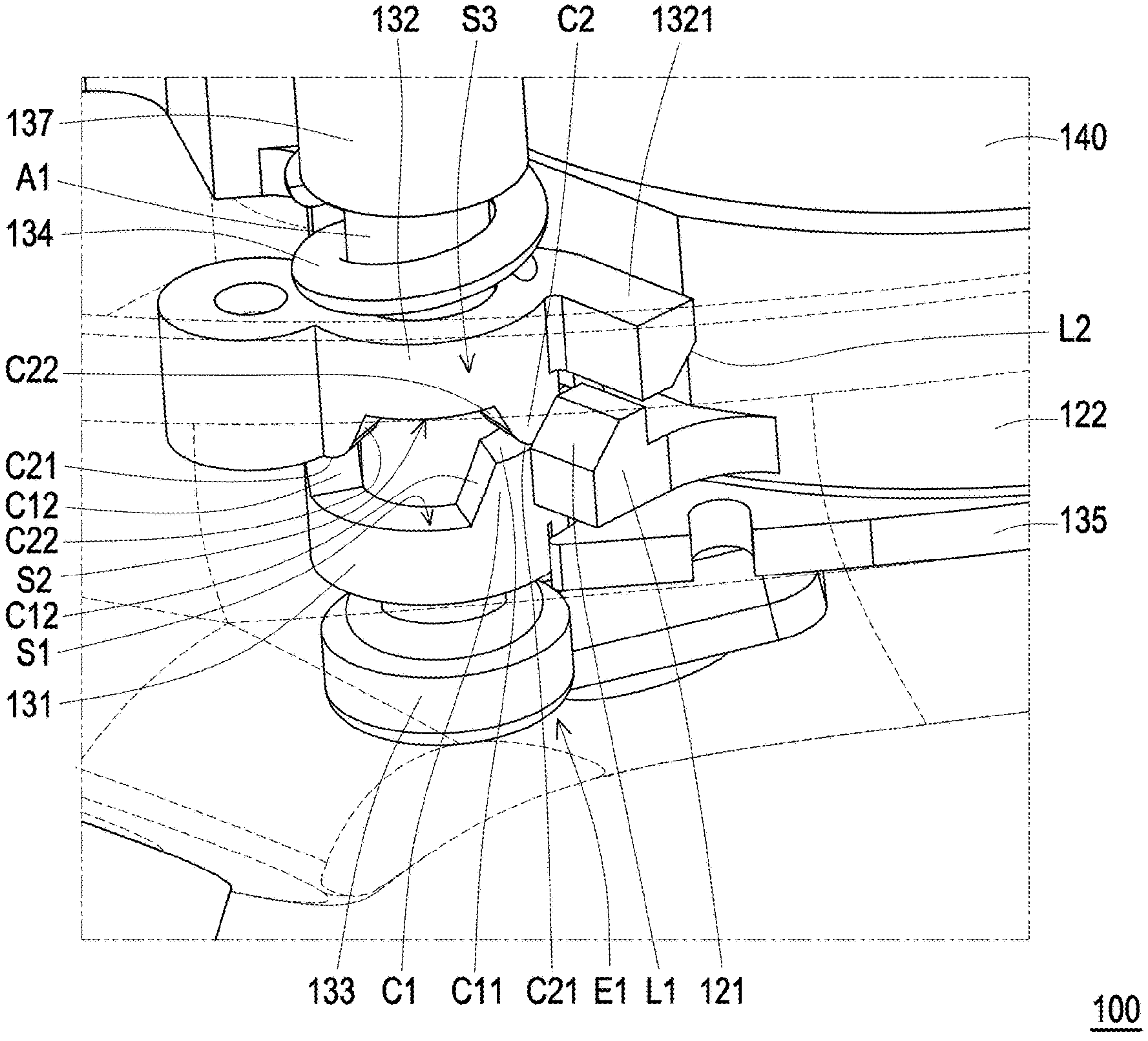
FIG. 4A and FIG. 4B are schematic diagrams of the actuation process of the electronic device in FIG. 2A.
Figure 4B:
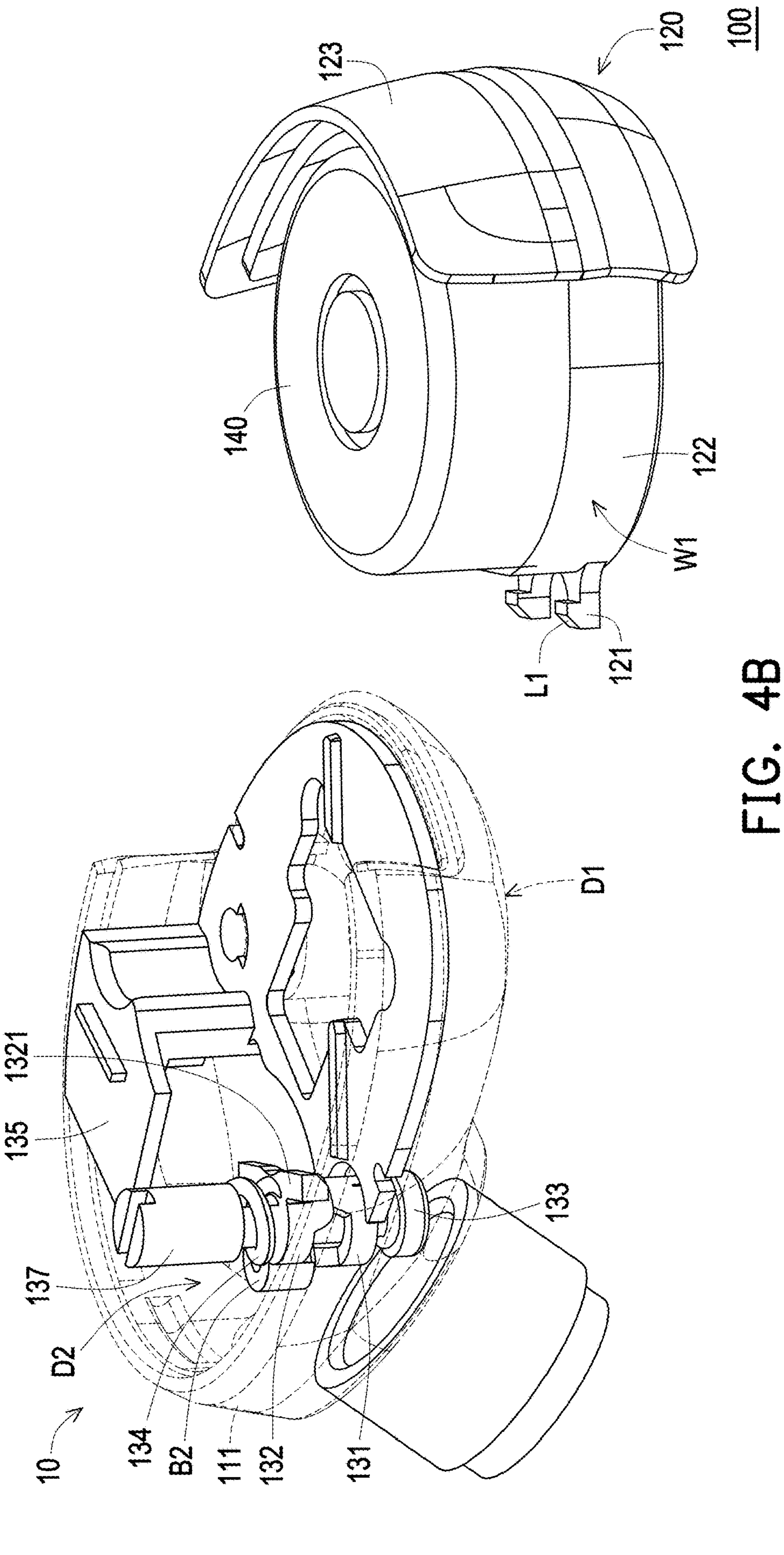

FIG. 4A and FIG. 4B are schematic diagrams of the actuation process of the electronic device in FIG. 2A. It should be noted that non-relevant structures are omitted in FIG. 4A and FIG. 4B to facilitate the display of required components.

Specifically, during the transition from the first state shown in FIG. 2B to a second state shown in FIG. 4A, the adjustment element 133 is rotated to drive the first cam 131 to rotate relative to the second cam 132, thereby pushing the second cam 132 away from the first cam 131 along an axial direction N1 of the adjustment element 133, to release an engaging relationship between the second engaging part 1321 and the first engaging part 121.

In this embodiment, when the engaging relationship between the second engaging part 1321 and the first engaging part 121 is released, as shown in FIG. 4B, the second structure 120 can be completely separated from the first structure 110.

Under the above configuration, the user can rotate the adjustment element 133, for example, 90 degrees, but not limited thereto. Since the adjustment element 133 is fixed to the first cam 131, the adjustment element 133 can drive the first cam 131 to rotate 90 degrees. In this way, the first cam 131 rotates to push the second cam 132, such that the second cam 132 moves away from the first cam 131 along the axial direction N1 of the adjustment element 133, to release an engaging relationship between the second engaging part 1321 and the first engaging part 121, so that the second structure 120 can be separated from the first structure 110 to achieve the effect of quick disassembly.

In this way, the user can easily replace the elements on the second structure 120, such as the battery module 140, so as to achieve the purpose of easily replacing the battery module 140 of the electronic device 100 without affecting the appearance of the product.

Specifically, in the first state shown in FIG. 2B, the first engaging part 121 and the second engaging part 1321 interfere with each other in the horizontal direction perpendicular to the axial direction N1. In this embodiment, the heights of the first protrusion C1 and the second protrusion C2 need to be greater than the height of the first engaging part 121 and the second engaging part 1321 interfering with each other, so that when the second protrusion C2 is pushed by the first protrusion C1, the second engaging part 1321 can be completely separated from the first engaging part 121 to release the interference state.

Figure 5:
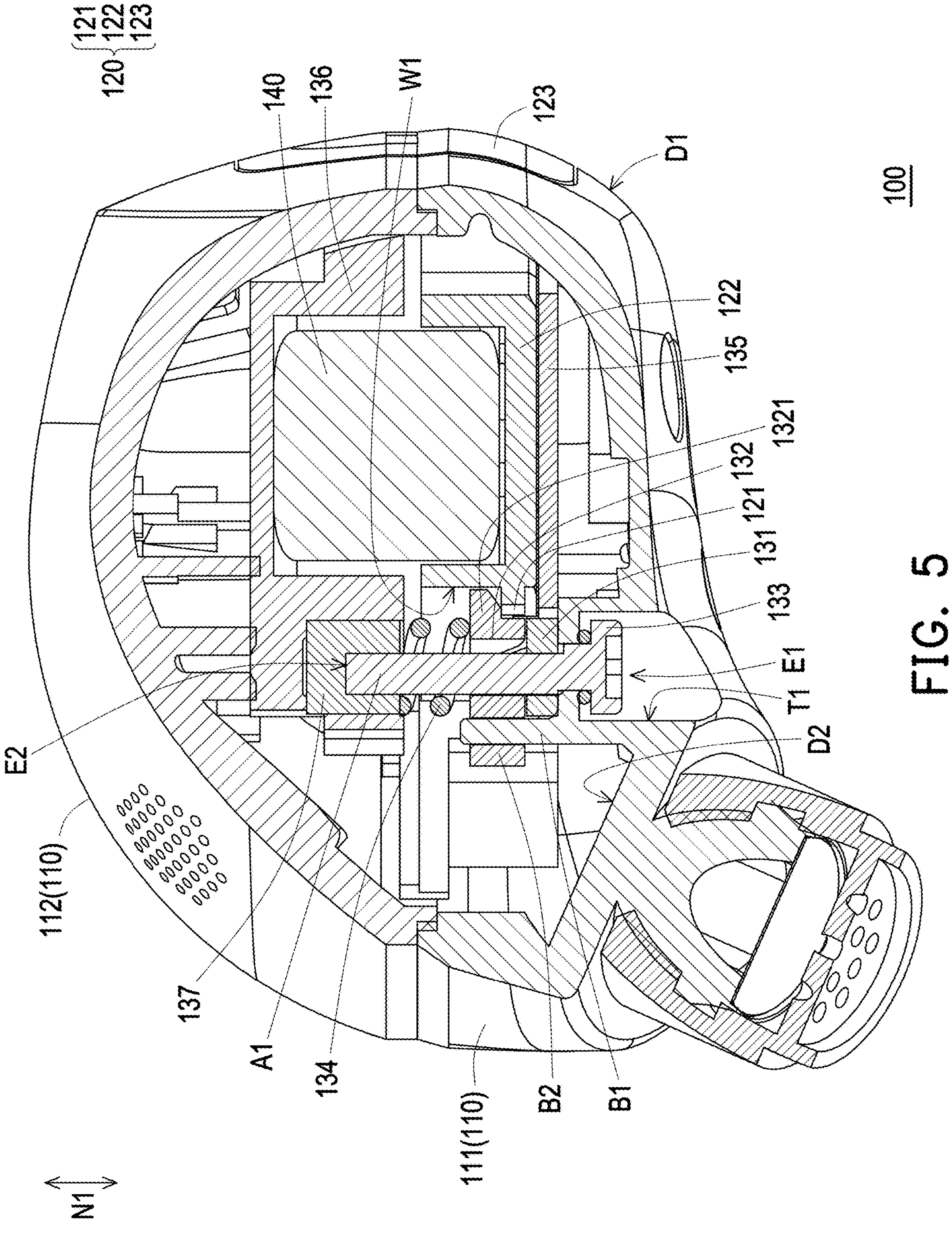
FIG. 5 is a cross-sectional diagram of the electronic device in FIG. 1.
Figure 6:
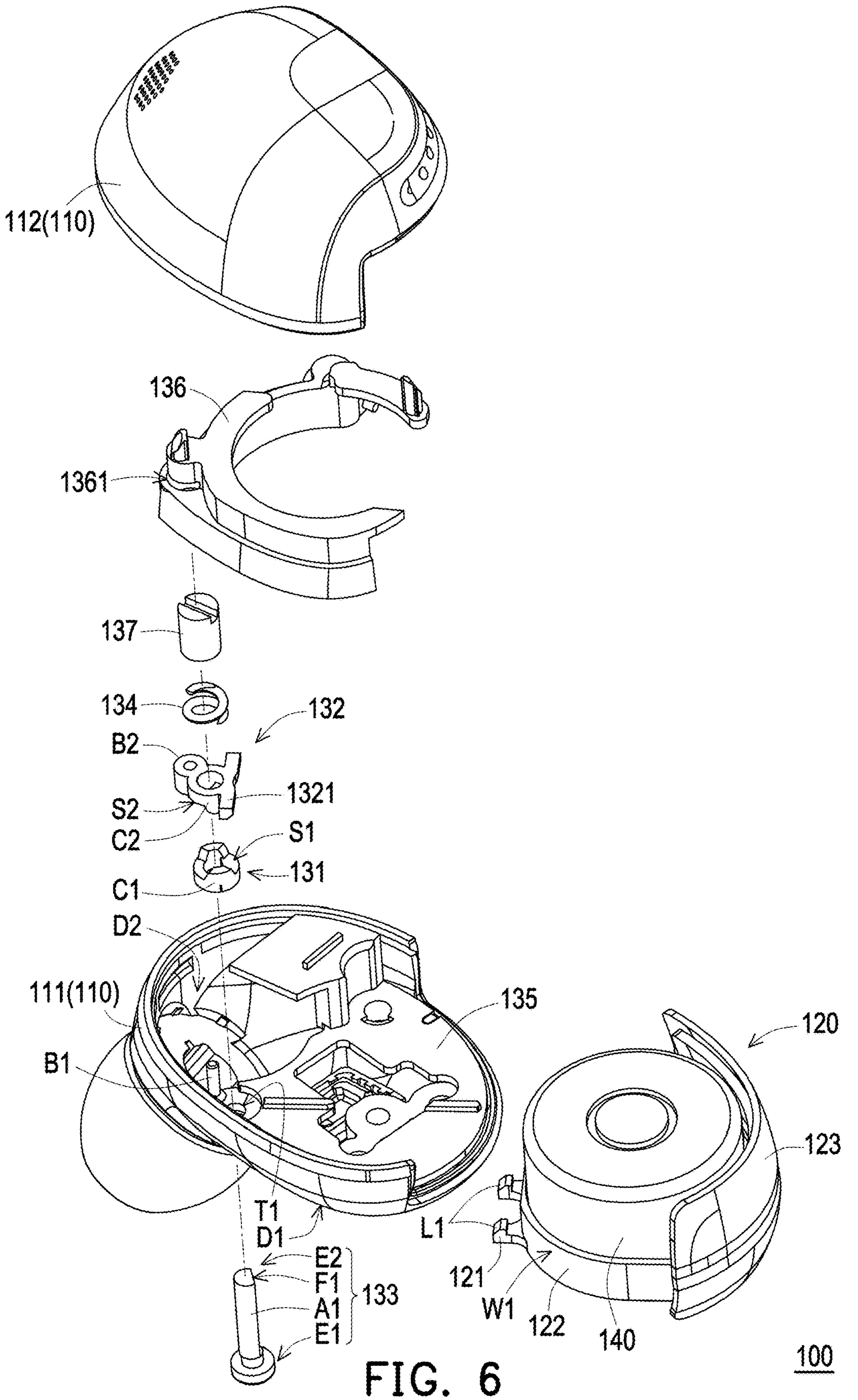
FIG. 6 is a breakdown diagram of the electronic device in FIG. 1.
Figure 7:
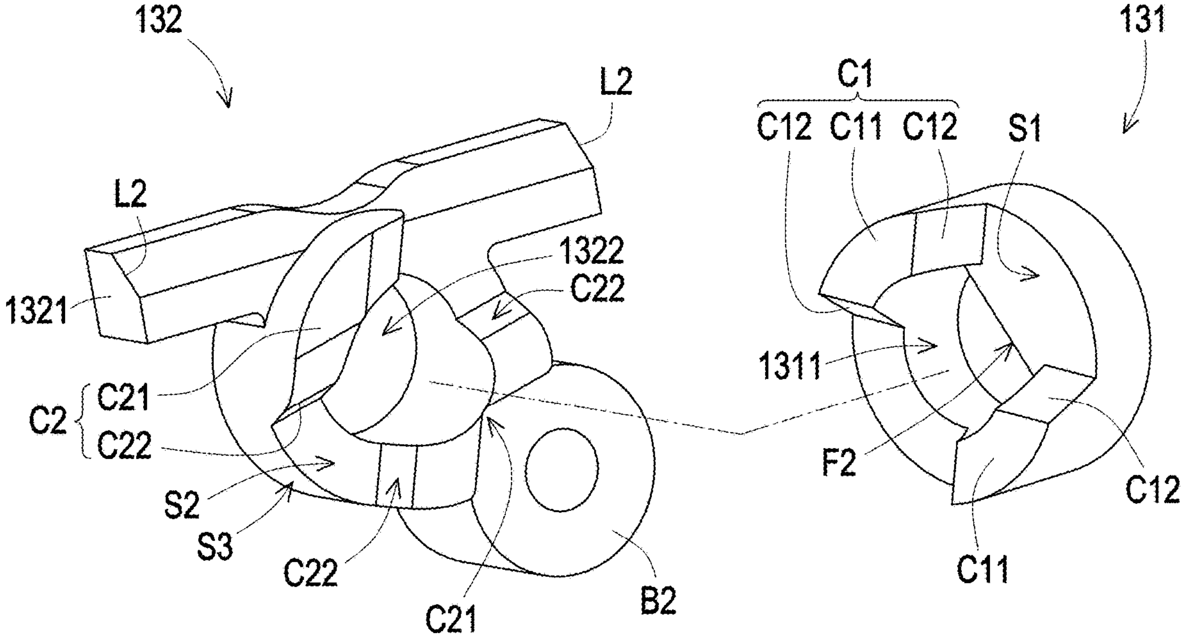
FIG. 7 is a three-dimensional schematic diagram of the first cam and the second cam of FIG. 6.

FIG. 5 is a cross-sectional diagram of the electronic device in FIG. 1. FIG. 6 is a breakdown diagram of the electronic device in FIG. 1. FIG. 7 is a three-dimensional schematic diagram of the first cam and the second cam of FIG. 6. It should be noted that non-relevant structures such as eartips are omitted in FIG. 5 to facilitate the display of required bumps.

Referring to FIG. 5, in this embodiment, the adjustment element 133 includes a shaft part A1 and has a first end E1 and a second end E2 opposite to each other.

In an embodiment, the first housing 111 includes a pivot shaft B1 located on the inner side D2, the pivot shaft B1 is parallel to the shaft part A1. The second cam 132 has a side surface S3 surrounding the second surface S2 and includes a pivot connection part B2 connected to the side surface S3. The pivot shaft B1 is inserted into the pivot connection part B2 to limit the rotation of the second cam 132.

In this embodiment, the adjustment element 133 is inserted into the hole T1 of the first housing 111. Specifically, the second end E2 of the adjustment element 133 passes through the hole T1, the first cam 131 and the second cam 132 to extend into the inner side D2 of the first housing 111.

Referring to FIG. 6, in this embodiment, the second structure 120 includes a base 122, and the battery module 140 of the electronic device 100 is disposed at the base 122. The first engaging part 121 protrudes from the wall surface W1 of the base 122. The second engaging part 1321 protrudes from the side surface S3 of the second cam 132. Here, the second engaging part 1321 is, for example, two buckling structures. The first engaging part 121 is, for example, two buckling structures corresponding to the second engaging part 1321, to be suitable for engaging with each other. However, in other embodiments, the number of engaging parts can be appropriately adjusted according to actual requirements, and the disclosure is not limited thereto.

In this embodiment, the fixing assembly 130 further includes an elastic member 134, a first supporting frame 135, a second supporting frame 136 and a fixing part 137. The elastic member 134 is sleeved on the shaft part A1. Here, the elastic member 134 is, for example, a spring, and the fixing part 137 is, for example, a nut, but not limited thereto.

In this embodiment, the first supporting frame 135 is connected to the inner side D2 of the first housing 111. The second supporting frame 136 is disposed on the first supporting frame 135 and includes a groove 1361. The fixing part 137 is disposed in the groove 1361, one end of the elastic member 134 is connected to the fixing part 137, and the other end of the elastic member 134 is connected to a side of the second cam 132 away from the second surface S2. The second end E2 of the adjustment element 133 is inserted into the fixing part 137.

In this embodiment, when the first protrusion C1 corresponds to and pushes the second protrusion C2, the second cam 132 moves upward and compresses the elastic member 134. When the first protrusion C1 and the second protrusion C2 are misaligned, the second cam 132 is reset by elastic force.

Furthermore, when the first engaging part 121 of the second structure 120 is completely separated from the second engaging part 1321 of the second cam 132, the user can reset the first cam 131 by rotating the adjustment element 133. Since the first cam 131 no longer pushes against the second cam 132, the second cam 132 can be reset by the elastic force of the elastic member 134, so that the first cam C1 does not correspond to the second cam C2.

Referring to FIG. 6 to FIG. 7, in this embodiment, the first cam 131 is located between the second cam 132 and the first end E1. The shaft part A1 of the adjustment element 133 is non-cylindrical. For example, the shaft part A1 has a plane F1. Correspondingly, the first cam 131 has a through hole 1311. Here, the through hole 1311 is a non-circular hole. For example, the through hole 1311 has a plane F2. In this way, the first cam 131 and the adjustment element 133 are fixed to each other and can rotate synchronously.

In this embodiment, the first cam 131 has a first surface S1 away from the first end E1 and includes a first protrusion C1 protruding from the first surface S1. The second cam 132 has a second surface S2 facing the first surface S1 and includes a second protrusion C2 protruding from the second surface S2. Here, the number of the first protrusions C1 and the second protrusions C2 is the same, and the number of the first protrusions C1 and the second protrusions C2 shown is two respectively, but not limited thereto.

In this embodiment, the first protrusion C1 has two first inclined surfaces C12 and a first top surface C11 located between the two first inclined surfaces C12. The second protrusion C2 has two second inclined surfaces C22 and a second top surface C21 located between the two second inclined surfaces C22.

In this embodiment, in the first state shown in FIG. 2B, the first surface S1 corresponds to the second top surface C21, and the second surface S2 corresponds to the first top surface C11. During the transition from the first state shown in FIG. 2B to the second state shown in FIG. 4A, the first top surface C11 of the first protrusion C2 moves from the second surface S2 through a corresponding second inclined surface C22 to the second top surface C21.

The following describes how the user intends to assemble the second structure onto the first structure.

Figure 8A:
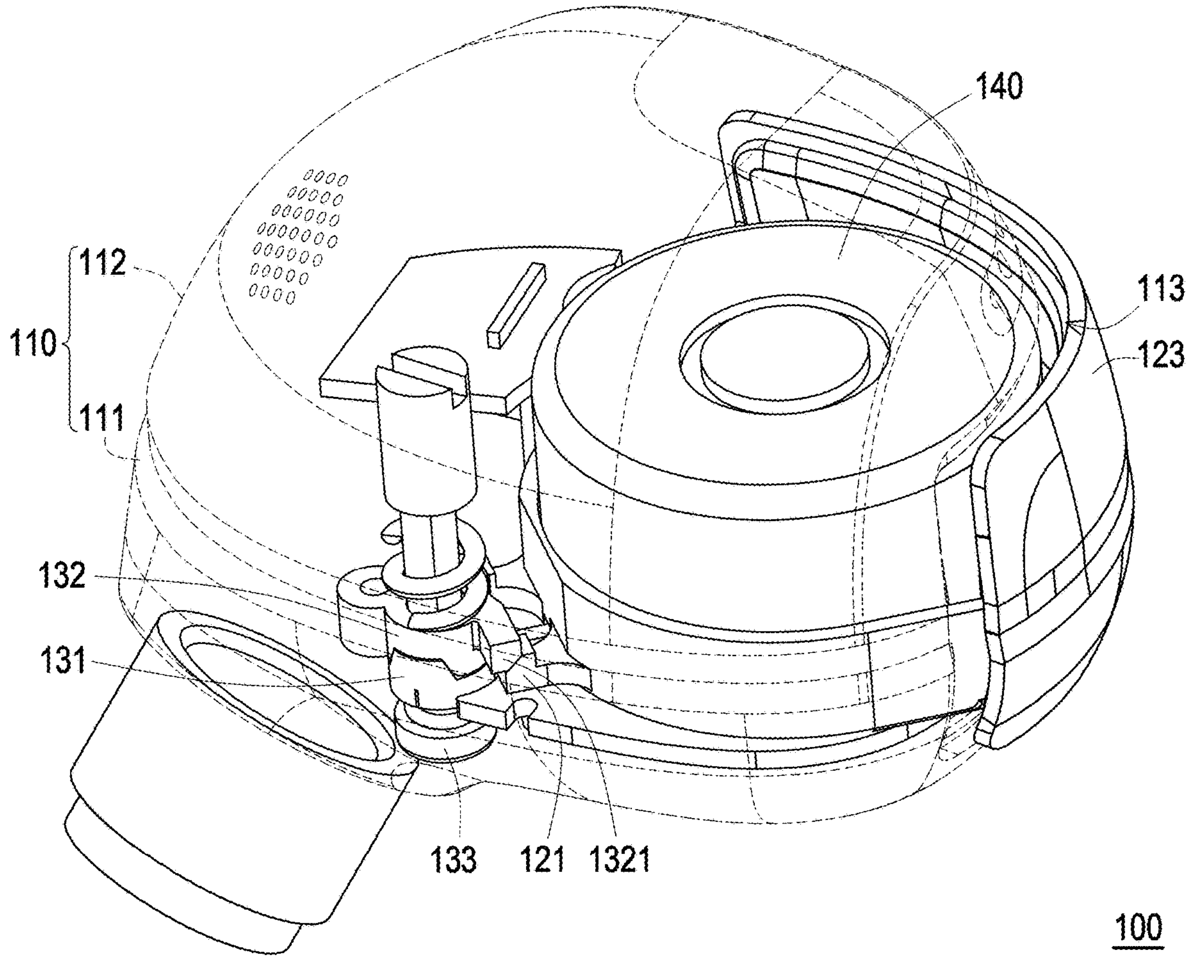
FIG. 8A is a schematic diagram of the actuation of the electronic device in FIG. 1.
Figure 8B:
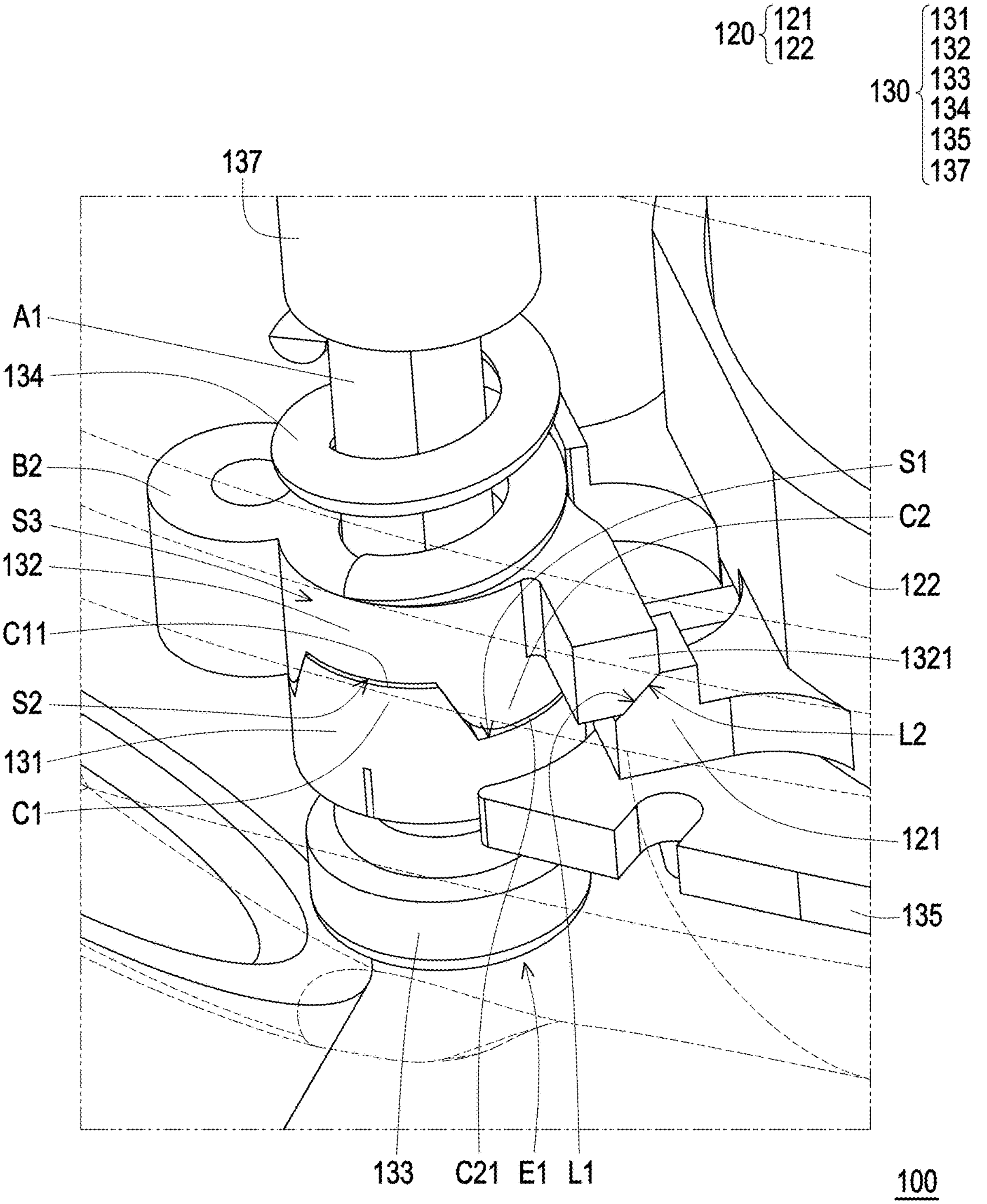
FIG. 8B is a partially enlarged schematic diagram of the electronic device in FIG. 8A.

FIG. 8A is a schematic diagram of the actuation of the electronic device in FIG. 1. FIG. 8B is a partially enlarged schematic diagram of the electronic device in FIG. 8A. Referring to FIG. 8A and FIG. 8B, the first engaging part 121 has a first bevel L1, and the second engaging part 1321 has a second bevel L2.

During the transition from the second state shown in FIG. 4B to the first state shown in FIG. 2B, the first engaging part 121 pushes the second cam 132 to move upward by abutting the first bevel L1 against the second bevel L2 (FIG. 8B), until the second engaging part 1321 is separated above the first engaging part 121. At this time, the first engaging part 121 no longer pushes against the second cam 132. The second cam 132 is reset by the elastic force of the elastic member 134, so that the first engaging part 121 and the second engaging part 1321 can quickly engage to complete positioning.

To sum up, in the electronic device of the disclosure, the adjustment element rotates and drives the first cam to rotate relative to the second cam, thereby pushing the second cam away from the first cam along an axial direction of the adjustment element, to release an engaging relationship between the second engaging part and the first engaging part, thereby allowing the second structure to be separated from the first structure. In this way, the user can easily replace the elements on the second structure, such as the battery module, so as to achieve the purpose of easily replacing the battery module of the electronic device without affecting the appearance of the product.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An electronic device, comprising:
- a first structure, comprising a first housing;
- a second structure, removably connected to the first structure and comprising a first engaging part; and
- a fixing assembly, disposed on the first structure and comprising:
  - a first cam;
  - a second cam, comprising a second engaging part; and an adjustment element, having a first end and a second end opposite to each other, the first end exposing to an outer side of the first housing, the second end passing through the first cam and the second cam to extend into an inner side of the first housing, wherein when the first structure is connected to the second structure, the first engaging part engages with the second engaging part to assume a first state, during a transition from the first state to a second state, the adjustment element rotates and drives the first cam to rotate relative to the second cam, thereby pushing the second cam away from the first cam along an axial direction of the adjustment element, to release an engaging relationship between the second engaging part and the first engaging part.

2. The electronic device according to claim 1, wherein the first cam is fixed to the adjustment element, and the first cam is located between the second cam and the first end.

3. The electronic device according to claim 1, wherein the first cam has a first surface away from the first end and comprises a first protrusion protruding from the first surface, the second cam has a second surface facing the first surface and comprises a second protrusion protruding from the second surface, the first protrusion has two first inclined surfaces and a first top surface located between the two first inclined surfaces, the second protrusion has two second inclined surfaces and a second top surface located between the two second inclined surfaces.

4. The electronic device according to claim 3, wherein in the first state, the first surface corresponds to the second top surface, and the second surface corresponds to the first top surface.

5. The electronic device according to claim 3, wherein during the transition from the first state to the second state, the first top surface of the first protrusion moves from the second surface through a corresponding second inclined surface to the second top surface.

6. The electronic device according to claim 3, wherein the fixing assembly further comprises an elastic member that is sleeved on a shaft part of the adjustment element and connected to a side of the second cam away from the second surface, when the first protrusion corresponds to and pushes the second protrusion, the second cam compresses the elastic member, when the first protrusion and the second protrusion are misaligned, the second cam is reset by elastic force.

7. The electronic device according to claim 6, wherein the fixing assembly further comprises:

a first supporting frame, connected to the inner side of the first housing;

a second supporting frame, disposed on the first supporting frame and comprising a groove; and a fixing part, disposed in the groove, one end of the elastic member connecting to the fixing part, another end of the elastic member connecting to the second cam, the second end of the adjustment element inserting into the fixing part.

8. The electronic device according to claim 3, wherein the second cam has a side surface surrounding the second surface, and the second engaging part protrudes from the side surface.

9. The electronic device according to claim 3, wherein the first housing comprises a pivot shaft located on the inner side, the pivot shaft is parallel to a shaft part of the adjustment element, the second cam has a side surface surrounding the second surface and includes a pivot connection part connected to the side surface, the pivot shaft is inserted into the pivot connection part.

10. The electronic device according to claim 3, wherein the first engaging part has a first bevel, the second engaging part has a second bevel, and during a transition from the second state to the first state, the first engaging part abuts the second bevel through the first bevel to push the second cam.

11. The electronic device according to claim 1, further comprising a battery module, the second structure comprising a base, the battery module disposing at the base, the first engaging part protruding from a wall surface of the base.

12. The electronic device according to claim 1, wherein the first structure further comprises a second housing, the first housing is assembled to the second housing and forms an opening, the second structure further comprises a shell member, the shell member is located at the opening in the first state.

* * * * *